US006222826B1

(12) United States Patent
Faynberg et al.

(10) Patent No.: US 6,222,826 B1
(45) Date of Patent: Apr. 24, 2001

(54) MULTIMEDIA CALLING METHOD AND APPARATUS

(75) Inventors: Igor Faynberg, East Brunswick; Hui-Lan Lu, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/974,322

(22) Filed: Nov. 19, 1997

(51) Int. Cl.$^7$ ................................................. H04L 12/66
(52) U.S. Cl. ............................................ 370/252; 379/229
(58) Field of Search ................................. 370/384, 385, 370/386, 388, 389, 340, 352, 230, 355, 356, 465; 379/354, 522, 229, 209; 709/203, 200

(56) References Cited

U.S. PATENT DOCUMENTS

| 5,608,786 | * | 3/1997 | Gordon | 379/100 |
| 5,625,404 | * | 4/1997 | Grady et al. | 379/105 |
| 5,629,978 | * | 5/1997 | Blumhardt et al. | 370/352 |
| 5,636,211 | * | 6/1997 | Newlin et al. | 380/465 |
| 5,661,790 | * | 8/1997 | Hsu | 379/201 |
| 5,673,312 | * | 9/1997 | Andruska et al. | 379/385 |
| 5,724,355 | * | 3/1998 | Bruno et al. | 370/524 |
| 5,812,765 | * | 9/1998 | Curtis | 709/200 |
| 5,828,844 | * | 10/1998 | Civanlar et al. | 370/395 |
| 5,867,495 | * | 2/1999 | Elliott et al. | 370/352 |
| 5,916,302 | * | 6/1999 | Dunn et al. | 370/359 |

OTHER PUBLICATIONS

"800 Service Using SPC Network Capability"; AT&T Technical Journal; vol. 61, No. 7, Sep. 1982; Authors. D. Sheinbein and R. P. Weber. pp. 1737–1744.

"Intelligent Network Directions"; AT&T Technical Journal; Summer 1991, vol. 70, No. 3–4; Authors: Edward G. Sable and Herbert W. Kettler. pp. 2–10.

"The Evolution of Gobal Intelligent Network Architecture"; AT&T Technical Journal, vol. 70, No. 3–4; Authors: George Wyatt, Alvin Barshefsky, Robert V. Epley, Marc P. Kaplan, and Krish P. Krishnan. pp. 11–25.

"Intelligent Network Platforms In The U.S."; AT&T Technical Journal, vol. 70, No. 3–4, Summer 1991; Authors: Ernest G. Russo, M. Tawfik Abdel–Moneim, Linda L. Sand, Laura J. Shaw, Patricia D. Taska, and Ronald J. Wojcik pp. 26–43.

* cited by examiner

*Primary Examiner*—Salvatore Cangialosi
(74) *Attorney, Agent, or Firm*—J. J. Brosemer

(57) ABSTRACT

A method and apparatus for establishing multimedia calls over an intelligent telecommunications network in which the calls are requested through an internetwork of client computers and server computers and the internetwork of client computers and server computers is further connected to the intelligent telecommunications network. The method involves: 1) a caller generating a request for a call utilizing the internetwork to initiate the request; 2) delivering multimedia and/or audiovisual presentations(s) to the caller via the internetwork and/or public switched telephone network (PSTN); and 3) completing a circuit switched telephone call between the caller and a destination user subsequent to the delivery of the presentations(s) wherein the call is placed from within the intelligent network itself. In this manner, one or more multimedia advertisements or other presentations are delivered to the originating caller before completion of the requested call.

6 Claims, 5 Drawing Sheets

US 6,222,826 B1

MULTIMEDIA CALLING METHOD AND APPARATUS

TECHNICAL FIELD

This invention relates generally to the field of telecommunications and in particular to a method and apparatus for placing multimedia calls.

BACKGROUND OF THE INVENTION

The development of stored program control (SPC) switches in the 1960's made it possible for telecommunications service providers to introduce many new and sophisticated telecommunications services that have benefited both users and public switched telecommunications network (PSTN) service providers. One such service, the 800 service, which was described in an article by D.Sheinbein and R.P.Weber entitled "800 Service Using SPC Network Capability" that appeared in The Bell System Technical Journal, Vol. 61, pp. 1737–1744, 1982, allowed a customer to establish an area of the country from which he or she can receive calls without charge to the calling parties. The desirability of such "free calling" is evidenced by its pervasiveness. Specifically, the volume of 800 service calls has increased to the extent that its traffic has become a substantial percentage of all toll calls served by existing telephone switching systems.

Recently however, there has been an increasing interest and demand for alternative "free calling" telecommunications services. In response to this interest, telecommunications service providers have offered a service by which a calling party may complete free telephone calls, provided he or she agrees to listen to an audio advertisement presented telephonically. (See, for example, The New York Times, Oct, 28, 1997 and The Wall Street Journal, Oct. 29, 1997) The advertisement is delivered to the caller through his or her telephone via the PSTN, and the advertiser pays the bill for the telephone call.

Service providers, consumers, advertisers and network operators all desire additional, innovative free calling methods. Consequently, a continuing need exists for methods and apparatus which meet this need, and in particular ones that provide interactive multimedia advertisements and/or presentations to the caller.

SUMMARY OF THE INVENTION

An advance is made over the prior art in accordance with the principles of the present invention that is directed to a method and apparatus for delivering multiple and/or multimedia advertisements to a caller placing a telephone call. The method involves: 1) a caller generating a request for a call utilizing an internetwork of client computers and server computers to initiate the request; 2) delivering multimedia and/or audiovisual presentation(s) to the caller via the internetwork and/or PSTN; and 3) completing a circuit switched telephone call between the caller and a destination user subsequent to the delivery of the presentation(s) wherein said call completion is initiated from within the intelligent network itself as a result of a request from a server computer within the internetwork.

Advantageously, the method exploits Intelligent Network (IN) capabilities of the PSTN to provide signaling necessary for synchronizing the multimedia delivery. Additionally, since the subsequent circuit switched telephone call is initiated from within the IN itself and not by the caller's telephone, any possibility that the caller may be mistakenly charged for the call is prevented.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

By way of additional background, and as previously noted, the development of SPC switches made it possible for telecommunications service providers to introduce many new and sophisticated telecommunications services that have benefited both users and PSTN service providers. Furthermore, the introduction of out-of-band signaling techniques, now embodied in Signaling System No. 7 (SS7) and Integrated Services Digital Network (ISDN), expanded the geographical coverage of these services from switched-based to regional, and eventually worldwide. At the same time, continued evolution of services and their management led to further sophisticated services. Combining these major advances in telecommunications spawned a new type of service providing network, known as the intelligent network (IN). (See, for example, E. G. Sable, and H. W. Kettler, "Intelligent Network Directions", AT&T Technical Journal, Summer 1991; G. Y. Wyatt, A. Barshefsky, R. V. Epley, M. P. Kaplan and K. P. Krishnan, "The Evolution of Global Intelligent Network Architecture", AT&T Technical Journal, Summer 1991; and E. G. Russo, M. T.Abdel-Monelm, L. L.Sand, L. J.Shaw, P. D.Taska and R. J.Wojcik, "Intelligent Network Platforms In The U.S.", AT&T Technical Journal, Summer, 1991)

Importantly, the IN separates functions necessary for call switching from those needed for applications and services.

Figure 1:
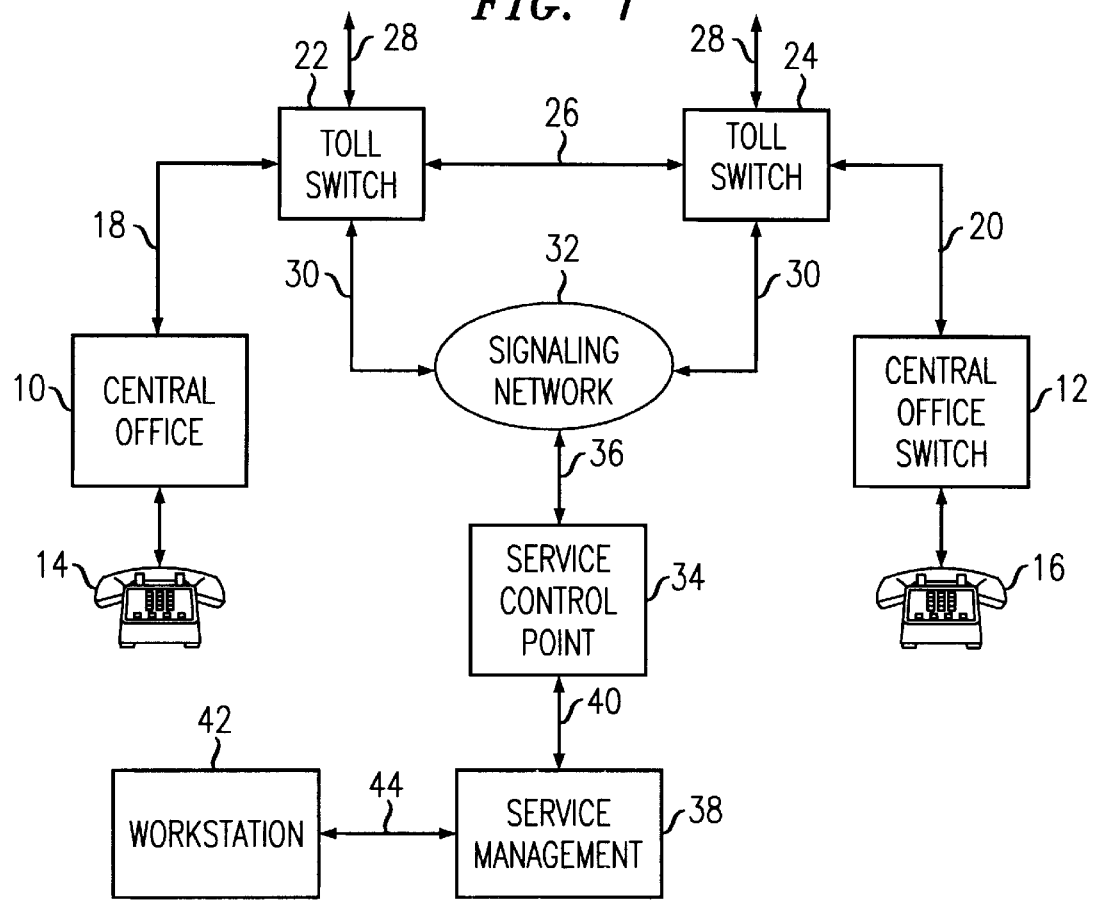
FIG. 1 shows in simplified block diagram form a prior art intelligent telecommunications network.

This separation has allowed platform capabilities to be introduced that permit the PSTN service providers to develop new services. FIG. 1 illustrates such a known intelligent telecommunication network that includes central office switches 10 and 12 which support a plurality of subscribers using premises equipment 14 and 16 respectively. The central office switches 10 and 12 are coupled by trunk lines 18 and 20 to toll switches 22 and 24 respectively. The toll switches 22 and 24 are connected together by a trunk line 26 and are connected to other central office switches and/or other toll switches by trunk lines 28. It will be apparent to those skilled in the art that a substantial number of central office switches and toll switches may be interconnected to provide a communication system within a geographic area such as within the continental United States. The illustrative premises equipment 14 and 16 may comprise analog or digital telephone sets as well as other communication equipment including terminals, computers linked by modems, and other forms of video or information systems.

A signaling network 32 that may follow the SS7 standard is connected by communication channels 30 to the central office and toll switches. It is well known that the signaling network will include a plurality of nodes such as signal transfer points (STP) which exist to relay (transmit) network messages between the switches in order to control the processing and routing of calls. A service control point (SCP) node 34, also known as a network control point (NCP), imparts intelligence on the network by providing processing logic and a store for subscriber data that is used by the network when handling call requests. As used herein and generally, the handling of a call means resulting actions based on an incoming call request and may include the providing of a variety of services including, but not limited to, determining a routing destination of the associated call.

A service management system (SMS) 38 is connected by a communication channel 40 to the SCP node 34. The SMS 38 is utilized to provision subscriber data and logic processing definitions stored in the SCP node 34. As generally practiced, a computer workstation 42 is coupled by communication channel 44 to SMS 38 and provides a system administrator or service provisioning agent with an interface to the SMS 38 and provides the mechanism by which call handling requirements of a customer are entered into the SCP node.

The SCP node 34 contains service logic that receives call processing messages from signaling network 32, processes such messages, and generates and transmits network messages transmitted to signaling network 32 which are routed to an appropriate switch to provide control instructions and data concerning the handling of a corresponding call. Such messages may comply with a known protocol such as the transaction capabilities application part (TCAP) as associated with the SS7 network. The SCP node 34 also contains a database which stores data associated with specific customers which is accessed by the signal processing routines in order to generate the network messages that will provide the instructions to the switches to provide the processing and routing of calls as desired by a called party.

Figure 2:
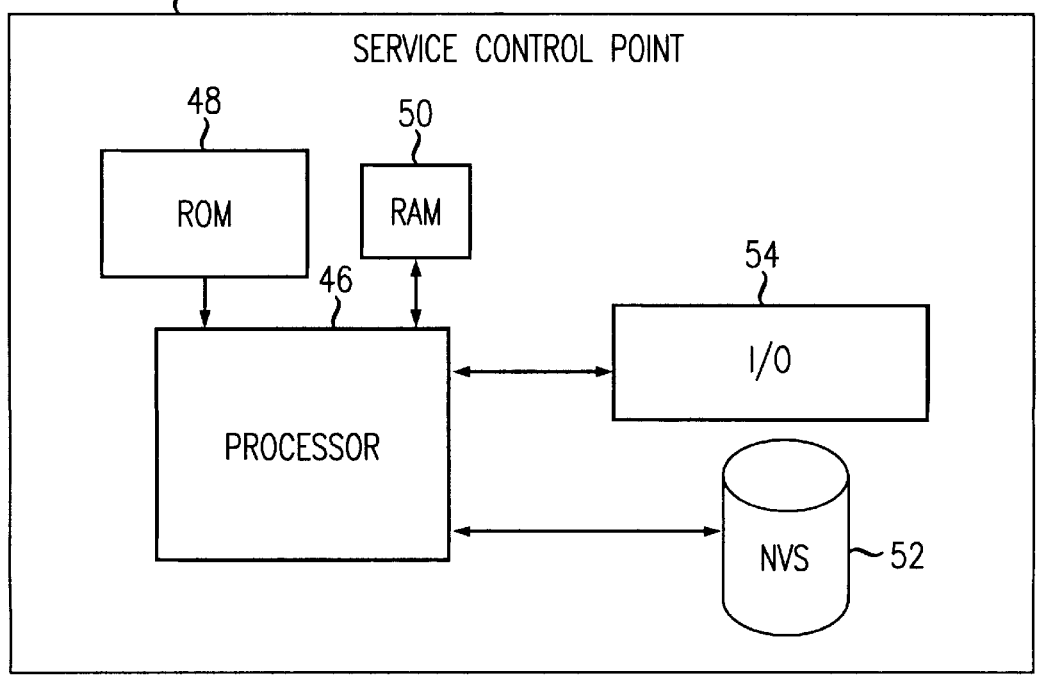
FIG. 2 shows in simplified block diagram form, an exemplary, prior art Service Control Point (SCP) node.

FIG. 2 illustrates a simplified block diagram of an exemplary SCP node 34. It contains a processing unit 46, read-only memory (ROM) 48, random access memory (RAM) 50 and a non-volatile data storage device 52 which may comprise a hard drive or other type of nonvolatile data storage. These elements are coupled to and support the operation of the processing unit 46. An input/output interface 54 is also coupled to the processing unit 46 and provides a communications interface for signals being transmitted and received on communications lines 36 and 40. Program control instructions that control the operation of processing unit 46, may be stored in the RAM 50, ROM 48, and storage device 52. As is known to those skilled in the art, such processing steps and operating routines may be accessed and utilized in accordance with the overall processing instructions executed by processing unit 46. The nonvolatile storage device 52, may also be utilized to store customer provided data related to different users and hence, provides the information necessary to make call handling decisions.

What will be readily appreciated by those skilled in the art is that the diversity of customer requirements for services deployed upon an IN has led to further refinements in the general architecture. Significantly, and based upon a specific customer needs, the service provider may elect to deploy all or a subset of the architectural elements. One such architectural element, the service-circuit-node (SCN), provides network access to a programmable node that includes highly specialized service circuits. Thus, the SCN complements existing network switching and database elements.

More recently however, telecommunications service providers have been witness to the emergence of the World Wide Web as a new form of information and communications technology. The vast World Wide Web of hyperlinked multimedia resources spans the glove, bringing information and entertainment to a growing population of users.

Figure 3:
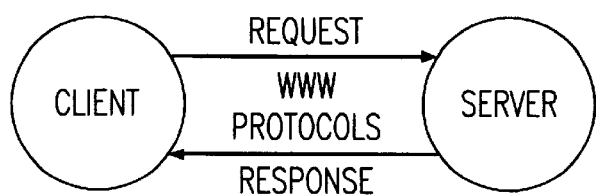
FIG. 3 shows in simplified form, a relationship between a client computer and server computer.

The World Wide Web (WWW) is a collection of client and server computers that support one or more WWV and internetworking protocols, i.e., Transmission Control Protocol—Internet Protocol (TCP/IP), HyperText Transfer Protocol (HTTP), or File Transfer Protocol (FTP), on an Internet or Intranet. As is known in the WWW community, a client is a program that wants something from a server and the server is a program that provides something to the client. This relationship between clients and servers is shown diagrammatically in FIG. 3.

Of significance, the WWW is said to have a "stateless" protocol because the servers immediately "forgets" any interactions with clients after it delivers any response(s) to the client. An aspect of WWW stateless protocols is that they permit a user to move quickly and easily from server to server (at a client side) or from client to client (at a server side) without much cleanup or tracking. This ability to move quickly is ideal for applications such as hypertext. An additional application of the WWW and its associated protocols is internet telephony.

Internet telephony appeared in early 1995 and was originally trumpeted by its advocates as providing "unlimited free long distance phone calling. " As with most new technologies, particularly those involving the WWW and the Internet, the realities of the technologies are different from the expectations of a user.

Figure 4:
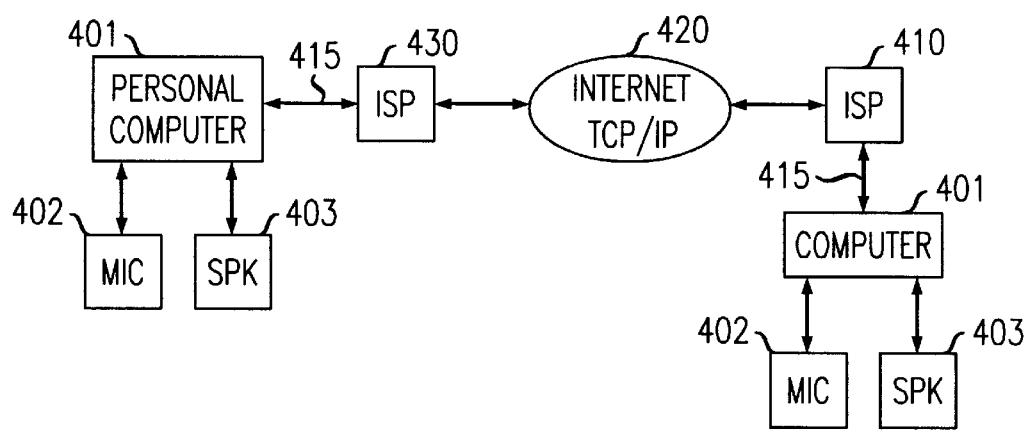
FIG. 4 shows in simplified block diagram form, an arrangement for conducting Internet telephone calls.

Specifically, and with reference to FIG. 4., Internet users may make two-way "telephone calls" if both parties are using computers 401 having audio capabilities, i.e., microphone 402 and speakers 403, an Internet connection 415, and compatible telephony software. A"call" over an Internet telephone sidesteps long-distance toll charges because each user typically connects to their Internet service provider 410 through a local call and the call is carried through the Internet 420 via packetized Internet protocols such as TCP/IP. Since the telecommunications charges associated with such calls are typically local in nature, long distance toll charges generally don't apply.

Unfortunately, significant problems exist with current IP telephony, and in particular the logistics and sound quality associated with making such calls. Specifically, the data required to transmit sound increases in proportion to its quality, so slower Internet connections reduce quality to maintain real-time conversation speeds. Also, arranging a voice connection between two users requires so much pre-planning that, at present, Internet telephony is ill-suited for ad hoc use. In fact, IP telephone users often telephone each other via PSTN to arrange a later online conversation. Additionally, the users of IP telephones must use complementary software on each of the computers 401.

Figure 5:
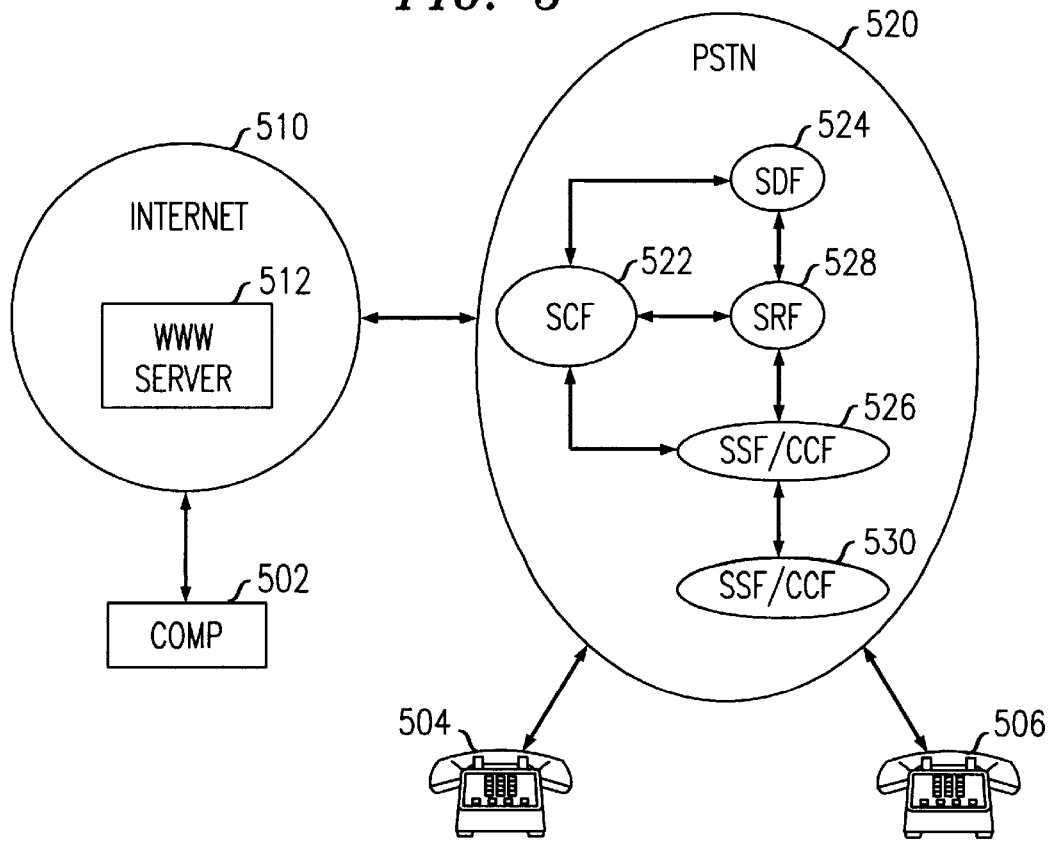
FIG. 5 is shows in simplified block diagram form, a combined Internet / PSTN network architecture according to the present invention.

With this additional background in place, our inventive method may now be readily presented and understood. With reference now to FIG. 5, there it shows a combined network comprising the WWW/Internet 510 and the PSTN 520. Specifically, a calling party wishes to place a call from originating telephone 504 to a called party on destination telephone 506.

Shown in FIG. 5 is a diagrammatic representation of the Internet 510 including a WWW server 512. Calling party is in communication with the Internet 510 through personal computer 502. Also shown is PSTN 520 having numerous IN elements such as IN Service Control Function (SCF) 522, which is described in a book entitled "The Intelligent Network Standards", authored by I. Faynberg, et al., McGraw Mill, 1997 and implemented in well-known Service Control Point (SCP), Network Control Point (NCP) or Service Circuit Node (SCN) IN elements. The SCF 522 is connected to WWW server 512 and a Switching Services Function/Call Control Function (SSF/CCF) 526.

The SCF 522 executes service logic. It provides capabilities that influence call processing by requesting other IN elements to perform specified actions. Implicitly, the SCF 522 provides mechanisms by which new services and features may be provided in the IN independent of any switching systems contained therein.

IN Specialized Resources Function (SRF) 528, such as that implemented in Network Services Complex (NSCX), SCN or 5ESS switch. The SRF 528 is connected to WWW server 512 and SSF/CCF 526. Finally, egress SSF/CCF 530, provides egress to destination telephone 506.

The Call Control Function (CCF) of the combined Switching Services Function/Call Control Function, SSF/CCF 526 provides the basic switching capabilities available in any switching system. These capabilities include the establishment, manipulation and releasing of calls and connections. Those skilled in the art will appreciate that it is a modern axiom of the telecommunications art that services, calls and connections (that comprise a call) should be separated. And while intelligent networking has indeed separated services from calls and connections, these latter two (calls and connections) are still combined within a single entity. It is CCF that provides trigger capabilities.

The Switching Services Function (SSF) element of the combined SSF/CCF 526 cooperates with the CCF in recognizing triggers and interacting with service control. A well-understood example of this function is the suspension of call processing during the conversion of a 800 number into a appropriate network routing number. As presently implemented, CCF and SSF functions are generally inseparable and network elements having SSF must also contain CCF. Specialized Resource Function (SRF) 528 provides a set of real-time capabilities including playing announcements and collecting input, i.e., DTMF or voice. The SRF 528 also provides conference bridging, particular types of protocol conversion and text-to-voice conversion.

Finally, Service Data Function (SDF) 524, provides database capabilities to either the SCF 522 or another SDF. Importantly, the SDF 524 functionality is separated from that of service control, SCF 522. Examples of SDF data management include: cross-network number translation performed for a Virtual Private Network (VPN) and Personal Communications Services (PCS); screening and authorization for calling card services; and customer record maintenance.

Figure 6:
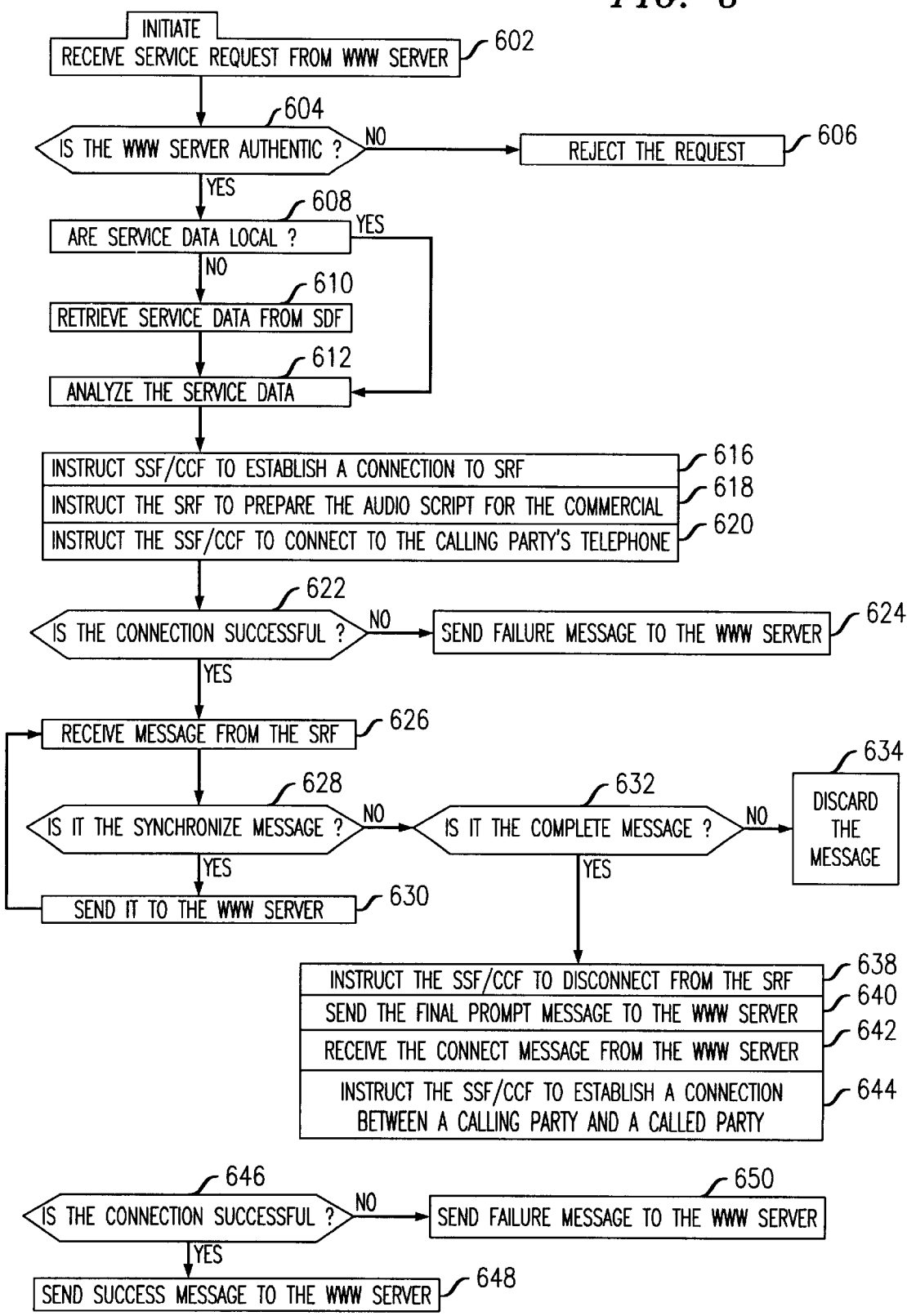
FIG. 6 is a flow diagram depicting the method of the present invention.

Turning now to FIG. 6., there is shown a flow diagram depicting our inventive method. Specifically, and with simultaneous reference to FIG. 5, and FIG. 6., a calling party initiates a request for telecommunications service on the personal computer 501 which is transmitted to the Internet 510 and in particular to WWW server 512. In a preferred embodiment, the WWW server 512 will prompt the calling party for a telephone number associated with originating telephone 504 and will generate an Initiate Service request and forward that request to the SCF 522 (step 602). The SCF 522 authenticates the WWW server 512 (step 604) and if the WWW server is not authentic, then the request is rejected (step 606).

After authenticating the WWW server 512, the SCF 522 retrieves service data from the SDF 524 (steps 608–610) if that data is not contained locally, analyzes retrieved data (step 612), and then instructs the SSF/CCF (526) to establish a connection to the SRF 528 (step 616). Next, the SCF 522 instructs the SRF 528 to prepare an audio script for any advertisement(s) (step 618), and instructs the SSF/CCF 526 to connect to the calling party's telephone 504 (step 626).

If, as depicted by step 622, the connection to the calling party's telephone 504 is not successful, then a failure message is sent to the WWW server 512 (step 624). Alternatively, if the connection to the calling party's telephone 504 is successful, then the SRF 528 starts playing an announcement (advertisement) to the calling party's telephone 504 while, concurrently, sending synchronize messages to the WWW server 512 (steps 626–630). As those skilled in the art will readily appreciate, the retrieval of synchronize messages from the SRF 528 by the SCF 522 and then relaying them to the WWW server 512 serves to initiate and synchronize video displays sent from the WWW server 512 to personal computer 502 being viewed by calling party. In this inventive manner, a changing video display on the personal computer 502 is synchronized with a announcement or advertisement played through calling party's telephone 504, thereby producing a multimedia presentation for a calling party in which video information is provided over a packetized Internet, and audio information is provided over a PSTN. Advantageously, many of the problems associated with the prior art are overcome by this method.

Continuing, if the calling party desires to spend variable lengths of time viewing any of the video information displayed on the personal computer 502, those skilled in the art will readily appreciate that replay functions are readily implemented by the WWW server in response to replay requests made by the caller on the personal computer through, for example, mouse or other input devices. If such a replay request is received by the WWW server 512, it in turn sends a replay message to the SCF 522 which restarts the respective announcement and its relevant synchronization activities.

When the SRF 528 has finished playing any announcements to the calling party's telephone 504, the SRF 528 sends a complete message to the SCF 522. Upon receipt of the complete message by the SCF 522, the SCF 522 instructs the SSF/CCF 526 to disconnect from the SRF 528 (step 638), sends a final prompt message to the WWW server 512

(step 640), receives a connect message from the WWW server 512 (step 642) which identifies a telephone number of the destination telephone 506, and finally, instructs the SSF/CCF to establish a connection from the calling party's telephone to the called party on the destination telephone 506. If this telephone connection to the destination telephone 506 is successful, then a success message is sent to the WWW server 512 (step 648), else a failure message is sent (step 650).

Figure 7:
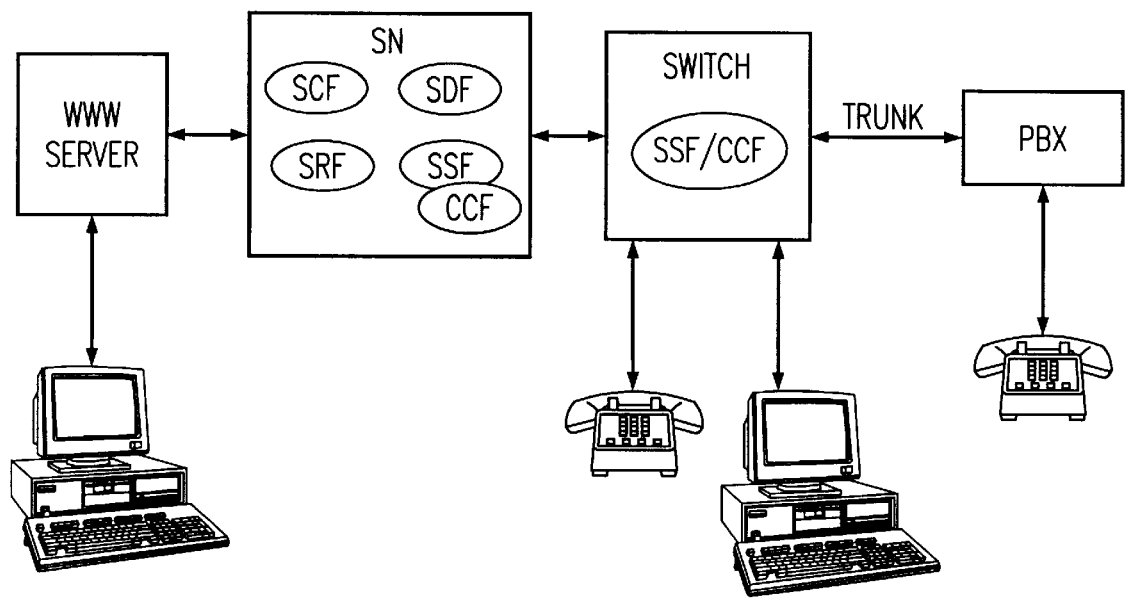
FIG. 7 is a simplified block diagram depicting a network architecture suitable for deploying the present invention.
Figure 8:
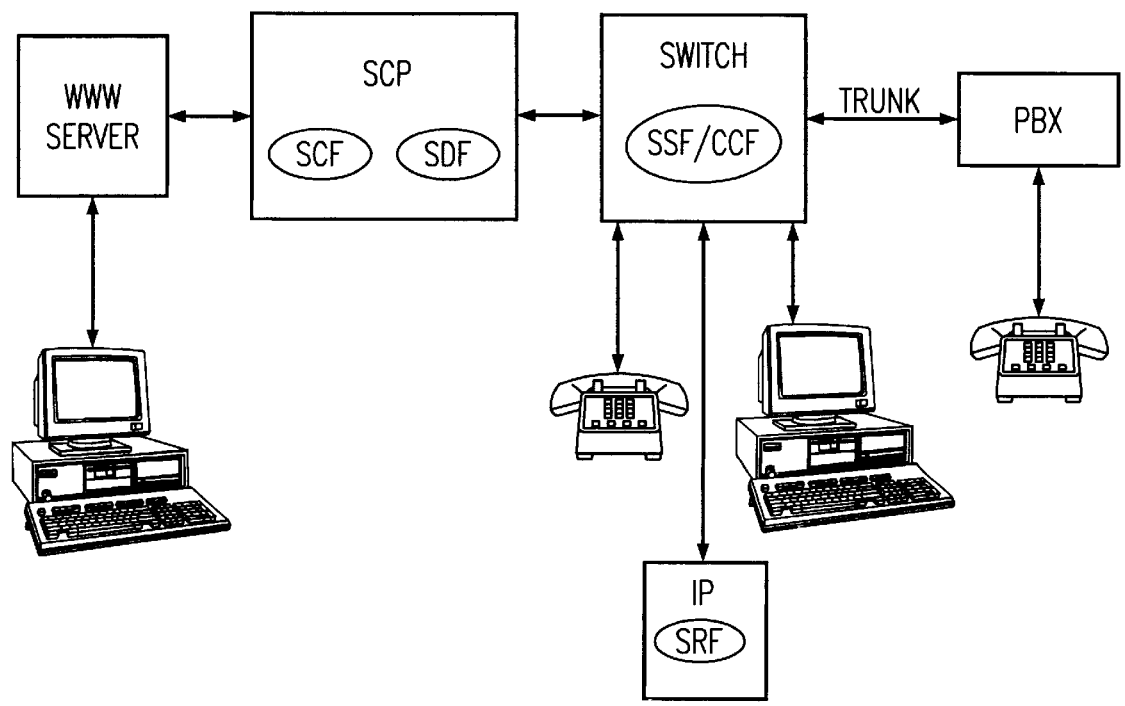
FIG. 8 is a simplified block diagram depicting another network architecture suitable for deploying the present invention.

Of course, many variations to the IN architecture described previously are possible that still support out inventive method. Specifically, FIG. 7 depicts the SCF within a Service Node (SN) which also contains the SDF and SRF. Similarly, FIG. 8 shows the SCF within a SCP that also contains the SDF. As shown in FIG. 8., the switch has an intelligent peripheral (IP) that has the SRF attached.

Figure 9:
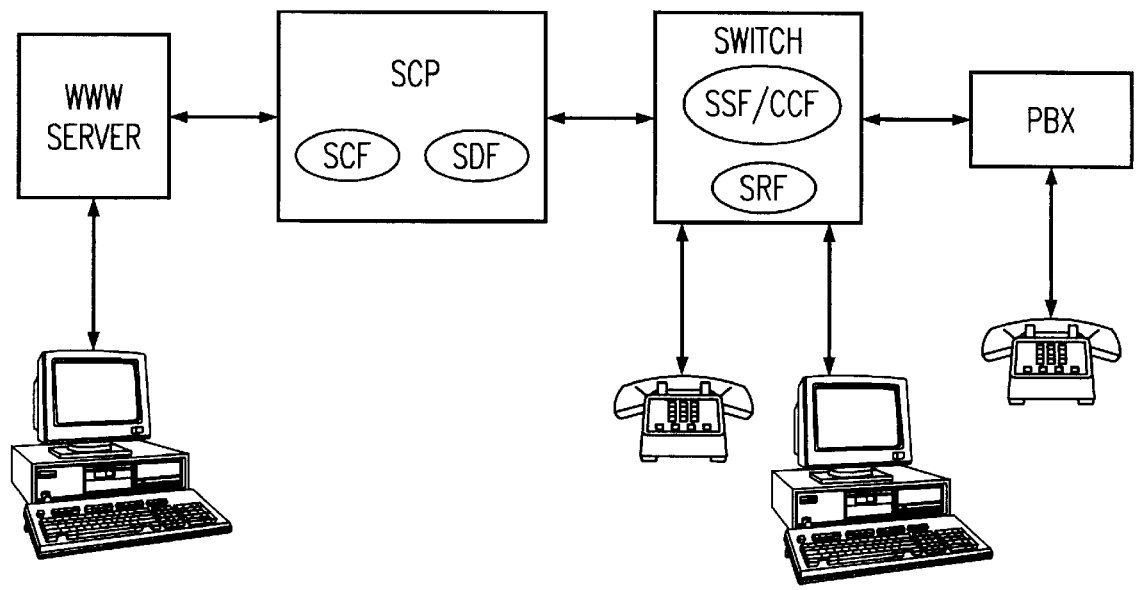
FIG. 9 is a simplified block diagram depicting yet another network architecture suitable for deploying the present invention.
Figure 10:
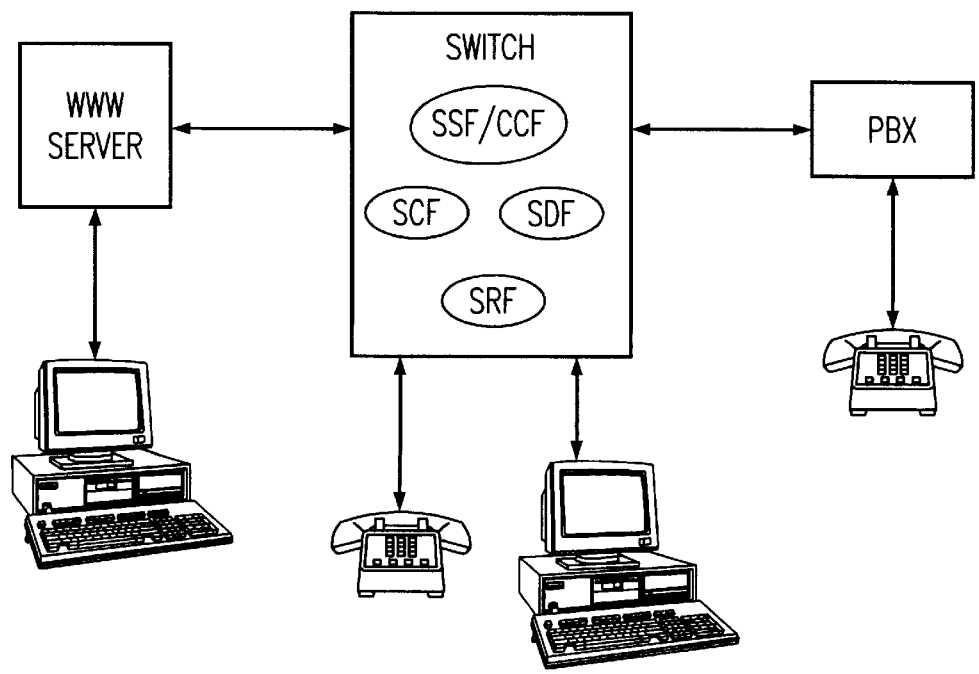
FIG. 10 is a simplified block diagram depicting a legacy network architecture suitable for deploying the present invention.

Additionally, FIG. 9 shows a configuration wherein the SCF is within the SCP that also contains the SDF. The switch shown in FIG. 9 contains an SRF, in addition to the SSF/CCF. Finally, FIG. 10 depicts a legacy switch based configuration. In this configuration, the switch is directly connected to the WWW server.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The claimed invention is:

1. An apparatus for establishing a multimedia call between an originating caller and a destination user over an intelligent, public switched telephone network (PSTN) comprising a plurality of telecommunications switching systems and data base systems, said switching systems and data base systems being interconnected by a signaling network and a transport network, said apparatus comprising:

means for generating, by an originating caller over a packet switched internet of client and server computers connected to the intelligent telecommunications network, a request for a call to be established between the originating caller and the destination user;

means for displaying one or more multimedia audiovisual presentations on a client computer connected to the packet switched internet and viewed by the originating caller wherein said audiovisual presentations are provided via the packet switched internet; and means for playing one or more audio presentations on an audio device connected to the intelligent telecommunications network;

means for synchronizing the display of the multimedia audiovisual presentations on the client computer with the playing of the audio presentation on the audio device connected to the intelligent telecommunications network; and means for completing the call request such that the intelligent network establishes a circuit switched connection via the public switched telephone network between the originating caller and the destination user only upon completion of the multimedia audiovisual Presentation provided via the packet switched internet.

2. The apparatus according to claim 1 further comprising:

means for signaling the intelligent network by a server computer within the internet to establish a connection from the originating caller to a destination user; and means for establishing a circuit switched connection through the intelligent telecommunications network from the originating caller to the destination user.

3. The apparatus according to claim 2 further comprising:

means for receiving additional input from the originating caller during the display of the multimedia audiovisual presentation; and means for determining, based upon the additional input, whether any subsequent multimedia audiovisual presentations are to be presented to the originating caller.

4. A calling method comprising:

generating, by an originating caller over a packet switched internet of client and server computers connected to an intelligent public switched telephone network, a request for a call to be established by the intelligent public switched telephone network;

providing, the originating caller with one or more multimedia and/or audiovisual presentations via the packet switched internet; and completing, the call request from the originating caller to a destination user via the intelligent public switched telephone network such that the call is initiated and established from within the intelligent public switched telephone network and only upon completion of the multimedia and/or audiovisual presentation provided to the originating caller via the packet switched Internet.

5. The method according to claim 4 further comprising:

providing, via the intelligent public switched telephone network, one or more audio presentations simultaneously with the multimedia presentation(s) provided via the packet switched internet; and synchronizing the multimedia presentation provided via the packet switched internet with the audio presentation provided via the intelligent public switched telephone network.

6. The method according to claim 5 further comprising:

receiving additional input from the originating caller; and determining, based upon the additional input, whether any subsequent multimedia audiovisual presentations are to be presented to the originating caller.

* * * * *